Jan. 17, 1950     W. J. CERNY     2,494,690
SCUFF PLATE LUGGAGE RACK
Filed March 22, 1947
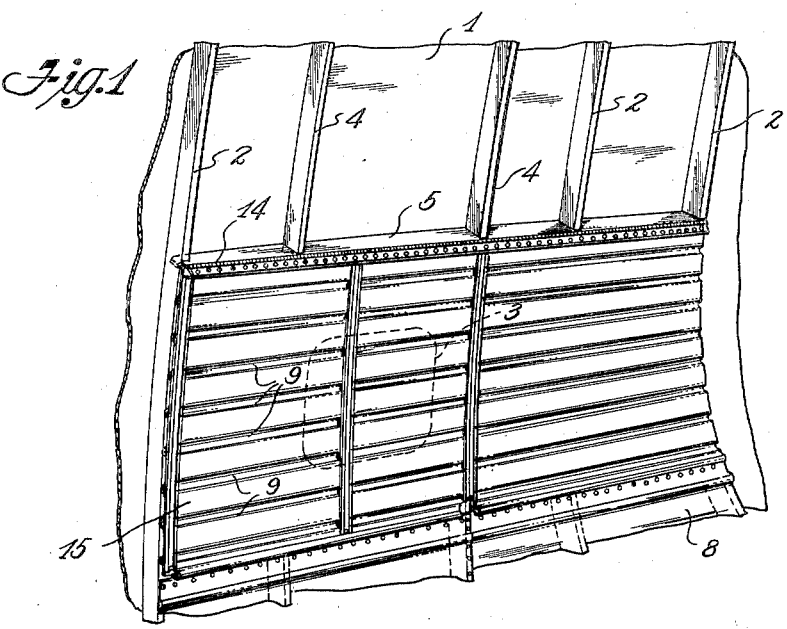
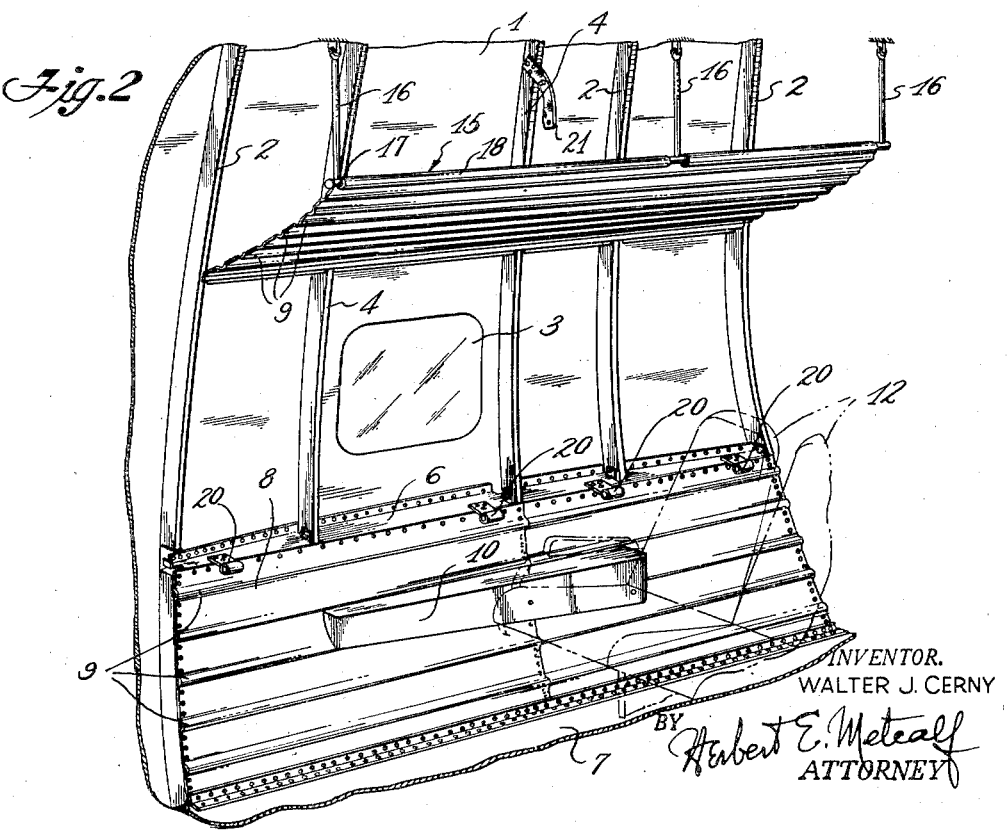
INVENTOR.
WALTER J. CERNY
BY Herbert E. Metcalf
ATTORNEY Patented Jan. 17, 1950

2,494,690

UNITED STATES PATENT OFFICE 2,494,690

SCUFF PLATE LUGGAGE RACK

Walter J. Cerny, Los Angeles, Calif., assignor to Northrop Aircraft, Inc., Hawthorne, Calif., a corporation of California Application March 22, 1947, Serial No. 736,606

3 Claims. (Cl. 244—118)

The present invention relates to vehicles alternatively used for carrying cargo and passengers, and more particularly to a means for protecting airplane windows when carrying cargo that is used as a luggage rack when the airplane is carrying passengers.

Many airplanes today are being fabricated for use as feeders to established airlines. As such they are many times fitted with windows and seats for passenger use, these seats being removed when cargo is carried. Modern airplanes usually employ a stressed skin construction where an outer thin skin is riveted to vertical ribs crossed by intercostal stiffeners. Windows, if installed, are usually placed in this outer skin between vertical ribs spaced more than the normal rib spacing distance. Furthermore, in order to protect the inwardly extending ribs from damage in moving cargo into and out of the airplane, it is customary to cover the ribs of the side walls inwardly with a strong stiffened scuff plate at least near the floor of the airplane. Consequently, when such a scuff plate is installed no windows are available unless a removable scuff plate section is used to cover the windows when cargo is carried. If such removable scuff plates are provided their removal and storage is a problem and they are liable to become bent and lost while passengers are being carried. Furthermore, a luggage rack over the passenger seats is a practical necessity and unless it too is removable valuable cargo space will be taken up. Furthermore, if both removable scuff plates and luggage racks are carried, weight is unduly increased.

Accordingly, it is an object of the present invention to provide a simple, light-weight means for protecting the windows of a vehicle such as an airplane when cargo is carried, and for supporting luggage when passengers are carried.

Other objects and advantages of the present invention will be more fully apparent by reference to the drawings and following description of a preferred embodiment.

In the drawings:

Figure 1 is a perspective view of the invention in scuff plate position.

Figure 2 is a perspective view of the present invention in luggage rack position in an airplane.

Referring to Figures 1 and 2, the airplane fuselage in which cargo and passengers are to be alternatively transported comprises an outer skin 1 riveted or otherwise fastened to internal vertical ribs 2. A window 3 is positioned in the skin 1 between two windowside ribs 4 spaced further apart than normal ribs to give sufficient area to the window. Ribs 2 are joined by longitudinal intercostal stiffeners, an upper intercostal 5 and a lower intercostal 6 above and below window 3, respectively.

From lower intercostal 6 to the floor line 7 of the fuselage a fixed scuff plate 8 is provided, longitudinally stiffened by ridges 9 and fastened to the inner surfaces of the underlying ribs. Projecting inwardly from fixed scuff plate 8 is, when removable seats are used, a seat fixture 10 to which the removable seats are laterally attached, the position of these seats when used being indicated by broken line 12.

Attached to ribs 2 and 4 and upper intercostal 6 by a piano hinge 14, is a hinged plate 15 also provided with longitudinal stiffening ridges 9.

Plate 15 is curved to fit the inner contour of ribs 2 and 4 and when rotated downwardly forms a continuation at lower intercostal 6 of scuff plate 8 completely covering window 3 and thus protecting the window during loading of cargo and transport thereof when the passenger seats are removed, as shown in Figure 1.

When passengers are to be carried, plate 15 is rotated upwardly to a substantially horizontal, inwardly extending position and maintained there by hinged hangers 16 attached to a rod 17. Rod 17 fits a downwardly and slightly inwardly rolled edge 18 on plate 15, as shown in Figure 2. Plate 15 thus forms a capacious luggage rack in proper position over the seats with full exposure of window 3 to the transported passengers.

When in scuff plate position, plate 15 is conveniently held in place by latch 20 on lower intercostal 6 and hangers 16 are tied back to ribs 2 and 4 by straps 21 thus clearing the entire space for cargo when seats are removed.

By means described and herein claimed, windows are protected and maximum space provided when cargo is carried, with window exposure and with luggage rack space provided over the passengers when passengers are transported, with minimum weight and minimum effort required for the shift.

What is claimed is:

1. In a vehicle alternatively loaded with cargo and passengers, a side wall having windows therein, a plate hinged to said wall above a window and rotatable to cover and protect said window when cargo is carried, and means for maintaining said plate extending substantially horizontally above said window and spaced below the top of the vehicle to form a luggage rack and luggage space when passengers are carried.

2. In a vehicle alternatively loaded with cargo and passengers, a side wall having an outer skin stiffened by internal ribs and having a window in said outer skin between said ribs, a plate hinged to said ribs above said window and rotatable to a downward position over said ribs and covering said window, and means for maintaining said plate extending substantially horizontally above said window and spaced below the top of the vehicle to form a luggage rack and luggage space when passengers are carried.

3. In a vehicle alternatively loaded with cargo and passengers, a side wall having an outer skin stiffened by internal ribs and provided with a window, a cargo scuff plate fixed to said ribs from the floor of said vehicle to a line below said window, a movable plate hinged to said ribs above said window covering said window and forming a continuation of said scuff plate when in downward position when cargo is carried, and means for maintaining said plate in a substantially horizontal position above said window and spaced below the top of the vehicle to form a luggage rack and luggage space when passengers are carried.

WALTER J. CERNY.

REFERENCES CITED

The following references are of record in the file of this patent:

UNITED STATES PATENTS

| Number | Name | Date |
|---|---|---|
| 1,249,488 | Posson | Dec. 11, 1917 |
| 1,874,610 | Payne | Aug. 20, 1932 |
| 2,396,039 | Burton et al. | Mar. 5, 1946 |